United States Patent

Takehana et al.

[11] Patent Number: 6,081,359
[45] Date of Patent: Jun. 27, 2000

[54] TRANSMITTING APPARATUS AND RECEIVING APPARATUS FOR WAVELENGTH-DIVISION-MULTIPLEX SIGNAL TRANSMISSION

[75] Inventors: Tsukasa Takehana; Tsutomu Tajima, both of Tokyo, Japan

[73] Assignee: NEC Corporation, Tokyo, Japan

[21] Appl. No.: 09/010,835

[22] Filed: Jan. 22, 1998

[30] Foreign Application Priority Data

Jan. 28, 1997 [JP] Japan ................................. 9-014283

[51] Int. Cl.[7] .............................. H04B 10/08; H04J 14/02
[52] U.S. Cl. ............................ 359/133; 359/110; 359/124
[58] Field of Search .................................... 359/124, 128, 359/133, 155, 161, 110

[56] References Cited

U.S. PATENT DOCUMENTS

| | | | |
|---|---|---|---|
| 5,299,293 | 3/1994 | Mestdagh et al. ....................... | 359/110 |
| 5,739,934 | 4/1998 | Nomura et al. .......................... | 359/124 |
| 5,920,414 | 7/1999 | Miyachi et al. ......................... | 359/133 |
| 5,923,453 | 7/1999 | Yoneyama ............................... | 359/177 |
| 5,999,291 | 12/1999 | Anderson ................................ | 359/133 |

Primary Examiner—Leslie Pascal
Assistant Examiner—Dalzid Singh

Attorney, Agent, or Firm—Whitham, Curtis & Whitham

[57] ABSTRACT

A transmitting apparatus has a plurality of optical signal transmitters, a plurality of transmitting transponders for converting the wavelengths of optical signals transmitted from the optical transmitters into respective wavelengths and transmitting wavelength-converted optical signals, a wavelength-division-multiplexer for wavelength-division-multiplexing the wavelength-converted optical signals, and an auxiliary transmitting transponder for converting a wavelength of an optical signal transmitted from the optical signal transmitters into a wavelength different from the wavelength-converted optical signals, and transmitting an auxiliary wavelength-converted optical signal. The transmitting transponders are monitored by a supervising unit, which outputs a detected failure signal when it detects a failure of one of the transmitting transponders. In response to the detected failure signal, a transmission switch supplies an output signal from the auxiliary transmitting transponder, rather than the output signal from the failing transmitting transponder, to the wavelength-division-multiplexer. A supervising control signal transmitting unit transmits a supervising control signal to an optical transmission path. In response to the supervising control signal, a receiving apparatus switches from a receiving transponder corresponding to the failing transmitting transponder to a receiving auxiliary transponder.

27 Claims, 4 Drawing Sheets

TRANSMITTING APPARATUS AND RECEIVING APPARATUS FOR WAVELENGTH-DIVISION-MULTIPLEX SIGNAL TRANSMISSION

BACKGROUND OF THE INVENTION

1. Field of the Invention

The present invention relates to a wavelength-division-multiplex signal transmission system, and more particularly to an improvement in such a wavelength-division-multiplex signal transmission system for increasing reliability in the event of a failure of a transponder.

2. Description of the Related Art

Research and development activities have intensively been made in recent years with respect to wavelength-division-multiplex signal transmission systems for dealing with a large amount of information. One wavelength-division-multiplex signal transmission system employs transponders.

A transponder is a device for converting the wavelength of an optical transmission device into a wavelength suitable for wavelength-division-multiplex transmission. An existing optical transmission device and a transponder may be combined into a wavelength-division-multiplex signal transmission system for increasing the transmission capacity of conventional systems.

FIG. 1 of the accompanying drawings shows a conventional wavelength-division-multiplex signal transmission system which employs transponders.

As shown in FIG. 1, the conventional wavelength-division-multiplex signal transmission system generally comprises a transmitting system and a receiving system.

The transmitting system comprises terminal units 1-1~1-n, transmitting transponders 2-1~2-n, a wavelength-division-multiplexer 8, an optical fiber amplifier 9, and an optical cogmbiner/divider (hereinafter referred to as a "WDM coupler") 17-1, and a supervising (SV) signal transmitting unit 6. The receiving system comprises a WDM coupler 17-2, an optical fiber amplifier 9, a wavelength-division-demultiplexer 10, receiving transponders 13-1~13-n, and terminal units 16-1~16-n, and a supervising (SV) signal receiving unit 15.

In the transmitting system, the transmitting transponders 2-1~2-n convert the wavelengths of optical signals transmitted from the respective terminal units 1-1~1-n into respective wavelengths λ1~λn suitable for wavelength-division-multiplex transmission. The optical signals having the respective wavelengths λ1~λn which are outputted from the transmitting transponders 2-1~2-n are wavelength-division-multiplexed by the wavelength-division-multiplexer 8, amplified by the optical fiber amplifier 9, and then sent to the WDM coupler 17-1. The WDM coupler 17-1 combines the wavelength-division-multiplexed signals amplified by the optical fiber amplifier 9 with an SV signal outputted from the SV signal transmitting unit 6, producing a combined optical signal. The combined optical signal is applied to and transmitted through an optical fiber transmission path 18 to the receiving system.

In the receiving system, the combined optical signal transmitted from the transmitting system is divided into the wavelength-division-multiplexed signals and the SV signal by the WDM coupler 17-2. The SV signal is supplied to the SV signal receiving unit 15, and the wavelength-division-multiplexed signals are supplied to the optical fiber amplifier 9. The wavelength-division-multiplexed signals are amplified to a desired level by the optical fiber amplifiers, and then separated into the optical signals having the respective wavelengths λ1~λn by the wavelength-division-demultiplexer 10. The wavelengths λ1~λn are then converted into suitable wavelengths by the receiving transponders 13-1~13-n. The optical signals having the respective suitable wavelengths are supplied from the receiving transponders 13-1~13-n to the terminals units 16-1~16-n.

Even if the wavelengths of the optical signals transmitted from the respective terminal units 1-1~1-n are the same as each other, since the wavelengths are converted by the transponders 2-1~2-n, the optical signals can be wavelength-division-multiplexed, and hence the capacity of transmission by the wavelength-division-multiplex signal transmission system is relatively large.

Since the wavelengths that can be outputted from the respective transponders are fixed, auxiliary transponders need to be added for the respective wavelengths in order to provide against transponder failures. Furthermore, when a certain transponder, e.g., the transponder 2-1, suffers a fault and needs to be replaced with an auxiliary transponder which produces the same wavelength as the transponder 2-1, the terminal unit 1-1 must be switched off. Consequently, the wavelength-division-multiplex signal transmission system has a reliability problem in the event of a transponder failure.

SUMMARY OF THE INVENTION

It is therefore an object of the present invention to provide a transmitting apparatus and a receiving apparatus for wavelength-division-multiplex signal transmission, which have a reduced number of auxiliary transponders and are capable of detecting a failure of a transponder and automatically switching from the failing transponder to an auxiliary transponder for increased system reliability and maintainability.

To achieve the above object, there is provided in accordance with the present invention a transmitting apparatus for wavelength-division-multiplex signal transmission, comprising a plurality of optical signal transmitters for transmitting respective optical signals, wavelength converters (transmitting transponders) associated respectively with the optical signal transmitters, for converting the wavelengths of optical signals transmitted from the optical transmitters into respective wavelengths and transmitting wavelength-converted optical signals, and a wavelength-division-multiplexer for wavelength-division-multiplexing the wavelength-converted optical-signals and transmitting the wavelength-division-multiplexed signal. The transmitting apparatus also has an auxiliary wavelength converter (auxiliary transmitting transponder) for converting the wavelength of an optical signal transmitted from the optical signal transmitters into a wavelength different from the wavelength-converted optical signals, and transmitting an auxiliary wavelength-converted optical signal. The wavelength converters are monitored by a supervising unit, which outputs a detected failure signal when it detects a failure of one of the wavelength converters. In response to the detected failure signal, a transmission switch supplies an output signal from the auxiliary wavelength converter, rather than the output signal from the failing wavelength converter, to the wavelength-division-multiplexer. A supervising control signal transmitting unit transmits a supervising control signal, which is representative of information to identify the wavelength converter which suffers the failure and information indicating the switching to the auxiliary wavelength converter, to an optical transmission path.

The supervising unit compares the optical signals supplied to the wavelength converters and the wavelength-converted optical signals outputted from the wavelength converters to detect the failure. The transmitting apparatus also has a transmission optical signal amplifier for optically amplifying the wavelength-division-multiplexed signals.

According to the present invention, a receiving apparatus for wavelength-division-multiplex signal transmission, is combined with the above transmitting apparatus, and comprises a dividing unit for receiving the wavelength-division-multiplexed signals from the transmitting apparatus through the optical transmission path, dividing the wavelength-division-multiplexed signals into received optical signals, and transmitting the received optical signals, and optical signal receivers associated respectively with the received optical signals, for converting the received optical signals into respective electric signals. The receiving apparatus also has a reception switch responsive to the supervising control signal, for supplying the auxiliary wavelength-converted optical signal to one of the optical signal receivers which corresponds to the wavelength converter which suffers the failure if the auxiliary wavelength converter is active.

The receiving apparatus further includes receiving wavelength converters (receiving transponders) for converting wavelengths of the received optical signals and transmitting wavelength-converted received optical signals to the optical signal receivers, and optical filters connected to output terminals of the dividing unit for passing only wavelengths of the wavelength-converted optical signals.

The receiving apparatus further has a reception optical signal amplifier for optically amplifying the wavelength-division-multiplexed signals and supplying the amplified wavelength-division-multiplexed signals to the dividing unit.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1:
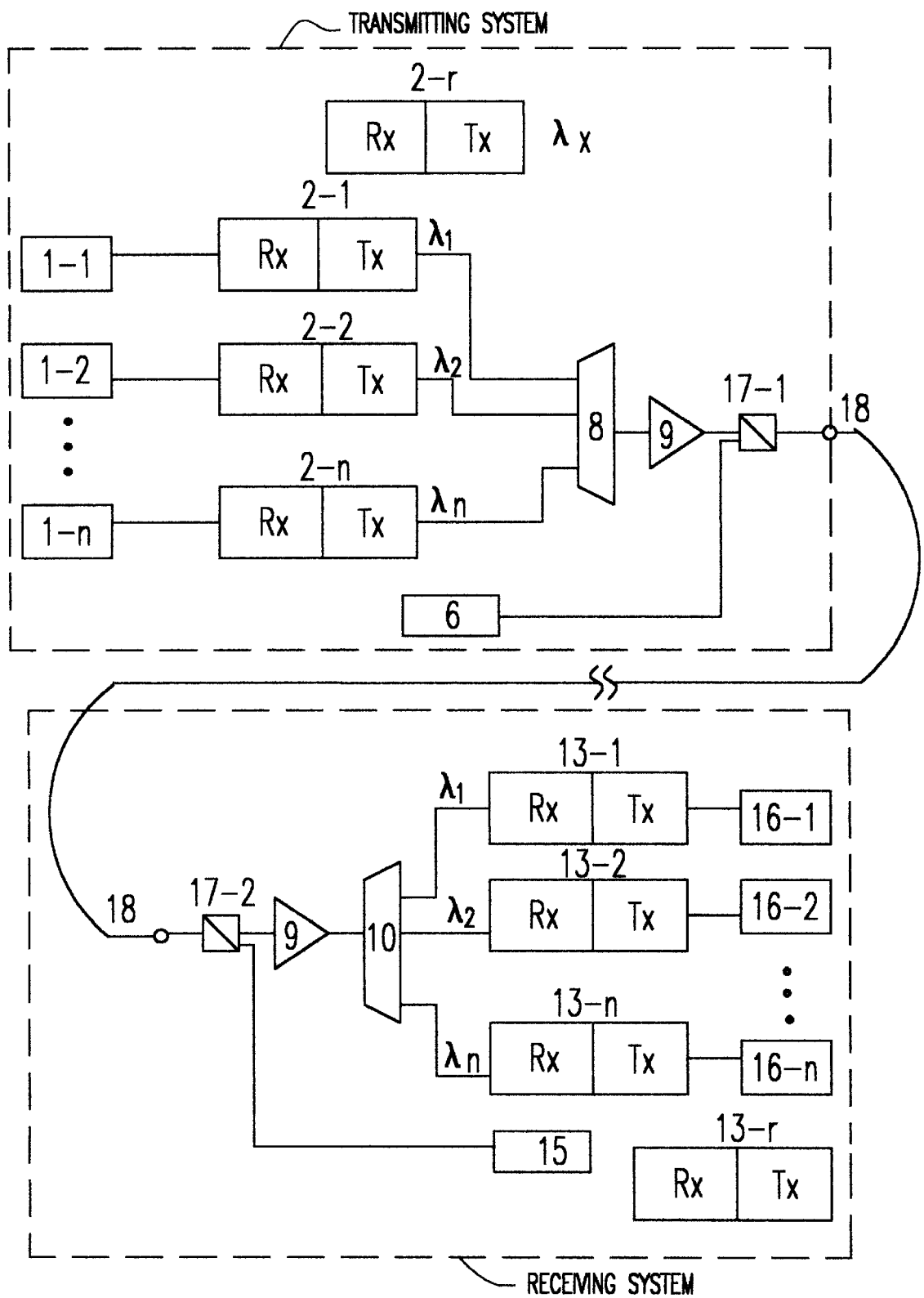
FIG. 1 is a block diagram of a conventional wavelength-division-multiplex signal transmission system.
Figure 2:
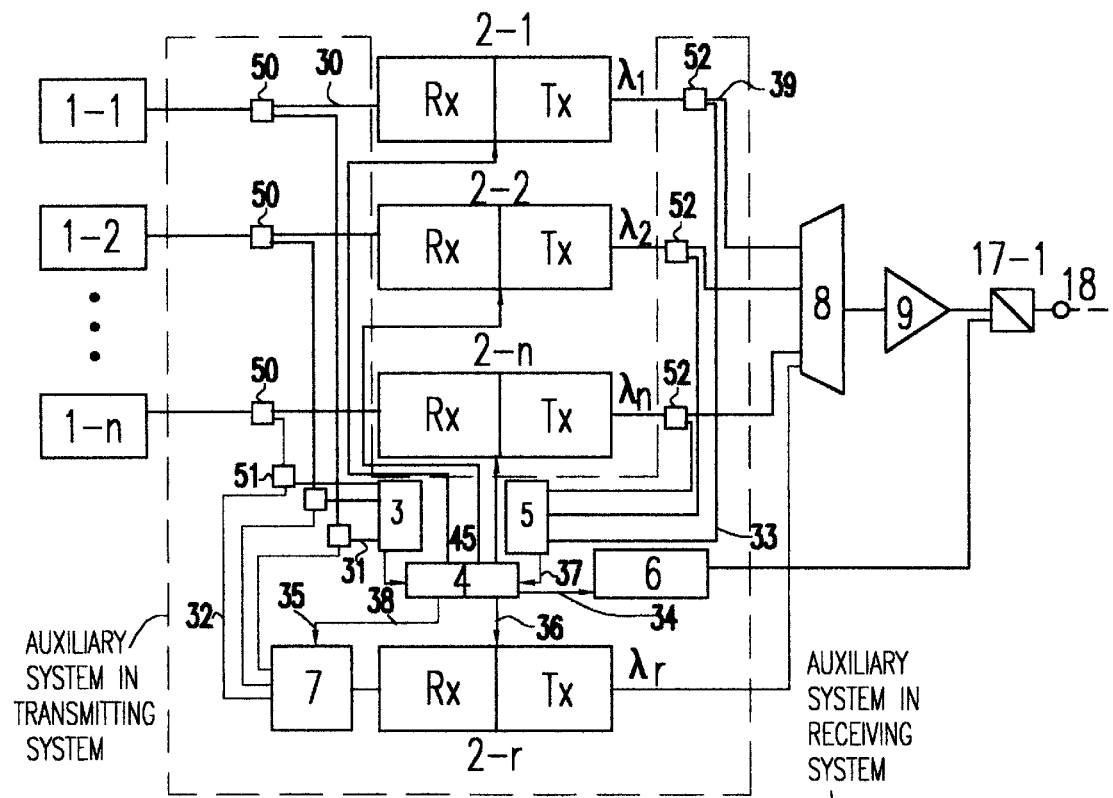
FIG. 2 is a block diagram illustrating the basic principles of a wavelength-division-multiplex signal transmission system according to the present invention.
Figure 2:
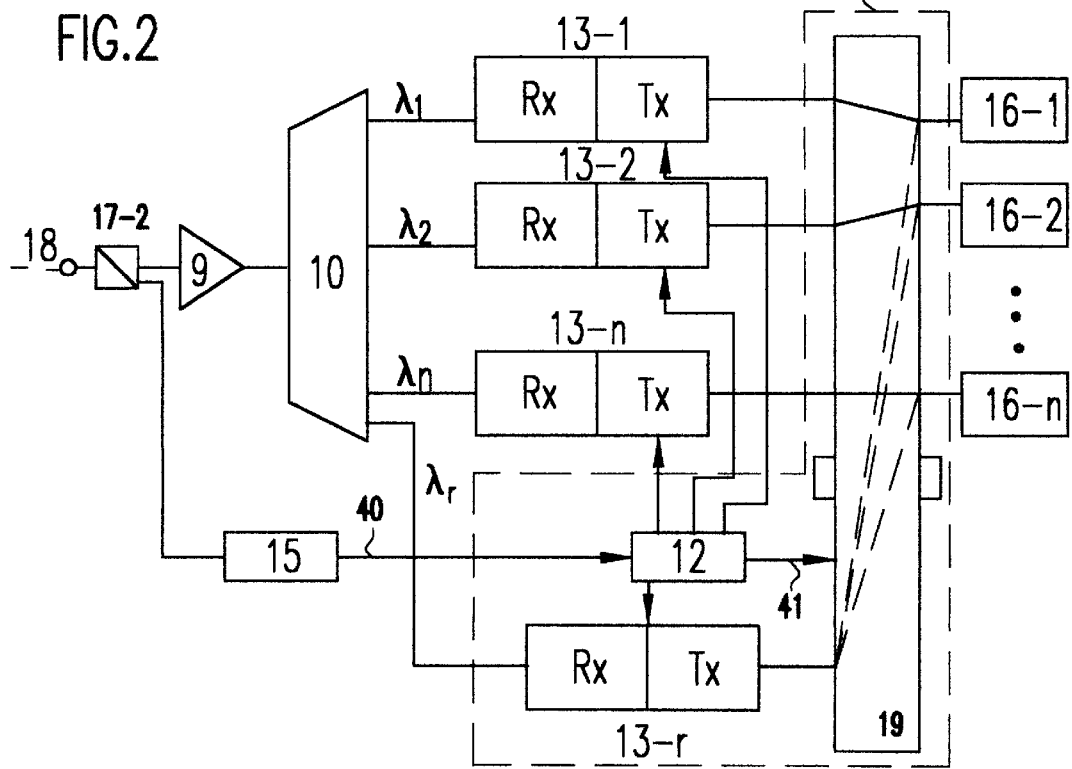

FIG. 2 shows in block form the basic principles of a wavelength-division-multiplex signal transmission system according to the present invention. Those parts shown in FIG. 2 which are identical to those shown in FIG. 1 are denoted by identical reference numerals and representations, and will not be described in detail below.

The wavelength-division-multiplex signal transmission system according to the present invention has at least one auxiliary transponder having a wavelength different from the output wavelengths of transponders that are in use under normal conditions. When one of the transponders that are in use suffers a failure, the wavelength-division-multiplex signal transmission system detects the failing transponder and switches from the failing transponder to the auxiliary transponder. Specifically, the wavelength-division-multiplex signal transmission system has an auxiliary system in each of a transmitting system and a receiving system.

The auxiliary system in the transmitting system comprises optical dividers 50, 51, 52, a transponder input supervising unit 3, a transponder output supervising unit 5, a transmitting auxiliary transponder 2-r, an n×1 optical switch 7, and a transmitting auxiliary system controller 4. The optical dividers 50, 51 serve to divide terminal unit output signals into main signals 30, auxiliary signals 32, and transponder input supervising signals 31.

The optical dividers 52 serve to branch transponder output supervising signals 33 from transmitting transponder output signals. The transponder input supervising unit 3 monitors the transponder input supervising signals 31, and the transponder output supervising unit 5 monitors the transponder output supervising signals 33. The transmitting auxiliary system controller 4 monitors the statuses of the transponders 2-1~2-n based on signals 38, 37 from the transponder input supervising unit 3 and the transponder output supervising unit 5, issues control signals 35, 36 to control the n×1 optical switch 7, stop the failing transponder, and energize the auxiliary transmitting transponder 2-r. The transmitting auxiliary system controller 4 also adds information as to the failing transponder and the energization of the transmitting auxiliary transponder 2-r to an SV signal 34, and sends the SV signal 34 from the SV signal transmitting unit 6 through the WDM coupler 17-1 to the receiving system.

The auxiliary system in the receiving system comprises a receiving auxiliary transponder 13-r, an (n+1)×n optical switch 19, and a receiving auxiliary system controller 12.

The receiving auxiliary system controller 12 obtains the information as to the failing transmitting transponder and the energization of the transmitting auxiliary transponder 2-r based on a signal 40 from the SV signal receiving unit 15, and de-energizes a receiving transponder that cannot be used, energizes the receiving auxiliary transponder 13-r, and controls the (n+1)×n optical switch 19 with a signal 41 based on the obtained information. The (n+1)×n optical switch 19 functions to supply an output signal from the receiving auxiliary transponder 13-r, instead of an output signal from the receiving transponder that has been disabled by the control signal from the receiving auxiliary system controller 12, to one of the terminal units 16-1~16-n.

Operation of the wavelength-division-multiplex signal transmission system shown in FIG. 2 will be described below.

It is assumed that the transmitting transponder 2-1 suffers a fault. The output signals from the terminal units 1-1~1-n are divided by the optical dividers 50, 51 into main signals 30 which are supplied to the transponders, transponder input supervising signals 31 which are supplied to the transponder input supervising unit 3 for monitoring the input signals of the transponders, and auxiliary signals 32 which are supplied to the n×1 optical switch 7. Transponder output supervising signals 33 produced by the optical divider 52 are supplied to the transponder output supervising unit 5 for monitoring output signals from the transponders. The transmitting auxiliary system controller 4 compares the input signals of the transponders monitored by the transponder input supervising unit 3 and the output signals of the transponders monitored by the transponder output supervising unit 5 to detect the failure of the transponder 2-1, stops the failing transponder 2-1, energizes the auxiliary transponder 2-r, and controls the optical switch 7 to supply the optical signal from the terminal unit 1-1 to the auxiliary transponder 2-r. At the same time, the transmitting auxiliary system controller 4 adds information as to the failing transponder and the energization of the transmitting auxiliary transponder 2-r to an SV signal, and sends the SV signal from the SV signal transmitting unit 6 through the WDM coupler 17-1 to the receiving system.

In the receiving system, based on the information as to the failing transponder and the energization of the transmitting auxiliary transponder 2-r received by the SV signal receiving unit 15, the receiving auxiliary system controller 12 de-energizes the receiving transponder 13-1, energizes the receiving auxiliary transponder 13-r, and controls the (n+1)×n optical switch 19 to supply the output signal from the receiving auxiliary transponder 13-r, rather than the output signal from the transponder 13-1, to the terminal unit 16-1.

In this manner, even in the event of a fault of a transmitting transponder in the wavelength-division-multiplex signal transmission system, the fault is detected and switching is automatically made from the failing transmitting transponder to the auxiliary transponder, resulting in an increase in the reliability of the wavelength-division-multiplex signal transmission system. Since the auxiliary transponder can be used as a backup transponder for all the transponders that are normally in use, it is not necessary to provide as many auxiliary transponders as the number of the wavelengths used, and hence the number of auxiliary transponders used is small.

Figure 3:
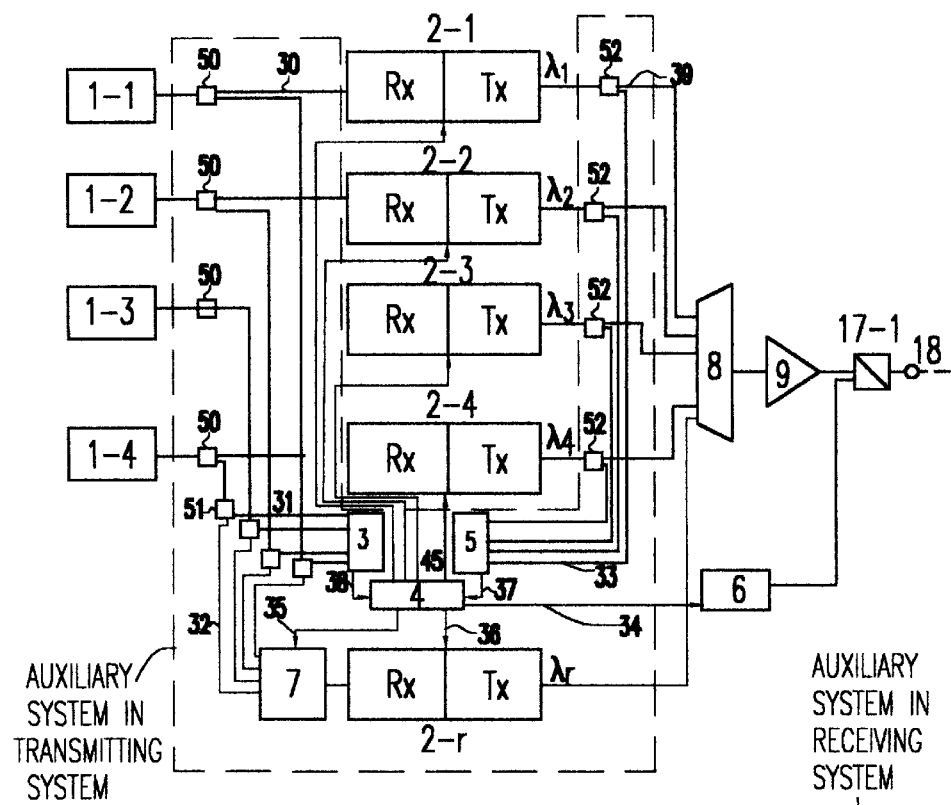
FIG. 3 is a block diagram of a transmitting apparatus and a receiving apparatus for wavelength-division-multiplex signal transmission according to a first embodiment of the present invention.
Figure 3:
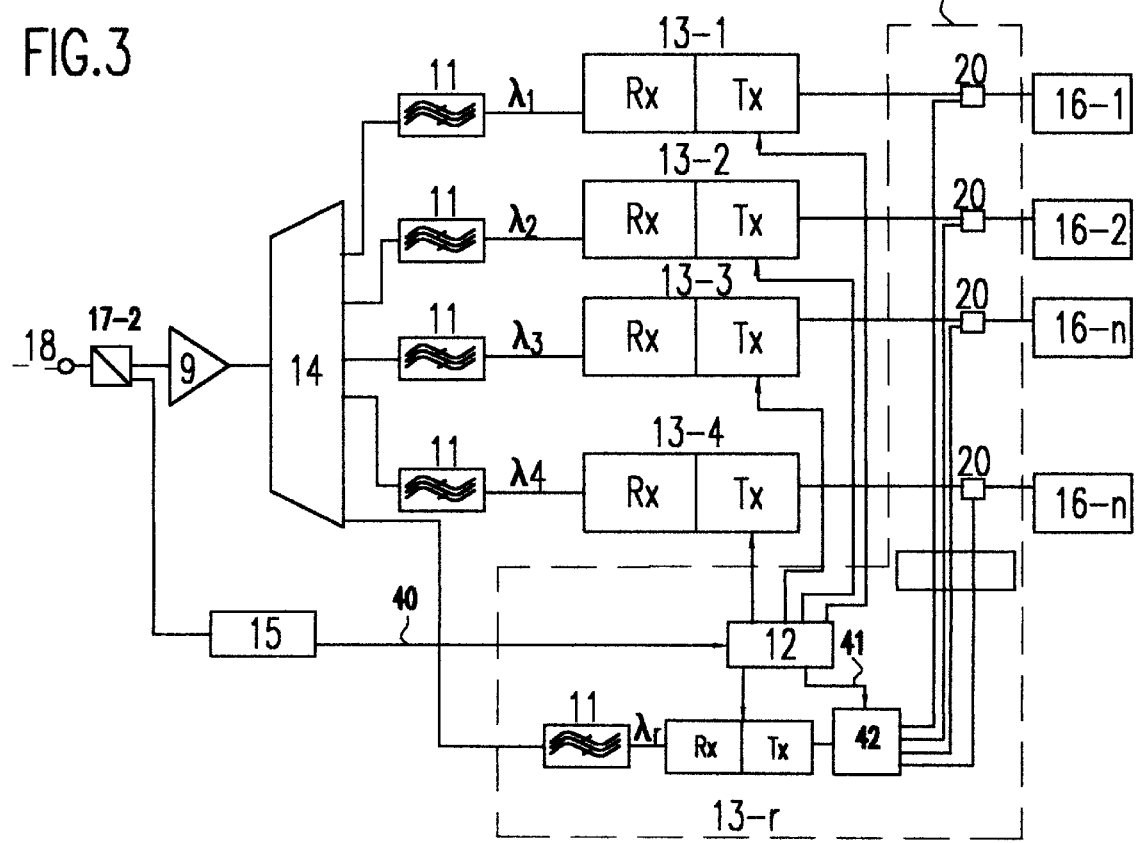

FIG. 3 shows in block form a transmitting apparatus and a receiving apparatus for wavelength-division-multiplex signal transmission according to a first embodiment of the present invention. Those parts shown in FIG. 3 which are identical to those shown in FIG. 1 are denoted by identical reference numerals and representations, and will not be described in detail below.

The first embodiment is applied to a four-wavelength-division-multiplex signal transmission system in which an output optical intensity abnormality of four transmitting transponders 2-1~2-4 (whose wavelengths are indicated by $\lambda1~\lambda4$) is detected and the failing transmitting transponder is switched to an auxiliary transponder (whose wavelength is indicated by $\lambda r$, $\lambda r \neq \lambda1~\lambda4$). The four-wavelength-division-multiplex signal transmission system is basically the same as the wavelength-division-multiplex signal transmission system shown in FIG. 2 except that a wavelength selecting unit, which corresponds to the wavelength-division-demultiplexer 10, comprises a 1×5 optical divider 14 and an optical bandpass filter 11, and the (n+1)×n optical switch 19 comprises a 1×4 optical switch 42 and four optical couplers 20.

In operation, output signals supplied from the terminal units 1-1~1-4 are divided by the optical dividers 50, 51 into main signals 30 supplied to the transmitting transponders 2-1~2-4, auxiliary signals 32 supplied to the optical switch 7, and transponder input supervising signals 31 supplied to the transponder input supervising unit 3. The transponder input supervising unit 3 monitors the intensities of optical signals supplied to the transmitting transponders 2-1~2-4.

Output signals from the transmitting transponders 2-1~2-4 are divided by the optical divider 52 into main signals 39 which are wavelength-division-multiplexed by the wavelength-division-multiplexer 8, amplified by the optical amplifier 9, combined with an SV signal by the WDM coupler 17-1, and then transmitted to the optical fiber transmission path 18, and transponder output supervising signals 33 which are supplied to the transponder output supervising unit 5 that monitors the intensities of the output optical signals from the transmitting transponders 2-1~2-4.

If the transmitting transponder 2-1 suffers a failure and it fails to produce an output signal, then the transmitting auxiliary system controller 4 detects the output failure of the transmitting transponder 21 based on the information from the transponder input supervising unit 3 and the transponder output supervising unit 5, stops the failing transmitting transponder 2-1, energizes the auxiliary transponder 2-r, and controls the 1×4 optical switch 7 to supply the optical signal from the terminal unit 1-1 to the auxiliary transponder 2-r. At the same time, the transmitting auxiliary system controller 4 adds information as to the failing transponder 2-1 and the energization of the transmitting auxiliary transponder 2-r to an SV signal, and sends the SV signal from the SV signal transmitting unit 6 through the WDM coupler 17-1 to the receiving system.

In the receiving system, the WDM coupler 17-2 divides the received signals into the SV signal and the wavelength-division-multiplexed signals. Based on the information obtained from the SV signal, the receiving auxiliary system controller 12 de-energizes the receiving transponder 13-1, energizes the receiving auxiliary transponder 13-r, and controls the optical switch 42 with a control signal 41. The wavelength-division-multiplexed signals are amplified to a desired level by the optical fiber amplifier 9, and separated into optical signals having respective wavelengths $\lambda2~\lambda4$, $\lambda r$ by the 1×5 optical divider 14 and the optical bandpass filter 11. After the wavelengths $\lambda2~\lambda4$, $\lambda r$ are converted by the receiving transponders 13-2~13-4, 13-r, the optical signals are supplied to the terminal units 16-1~16-4.

Therefore, even when the transmitting transponder 2-1 fails to operate and hence the corresponding receiving transponder 13-1 is shut off, these transponders 2-1, 13-1 are switched to the respective auxiliary transponders 2-r, 13-r for increased system reliability.

Figure 4:
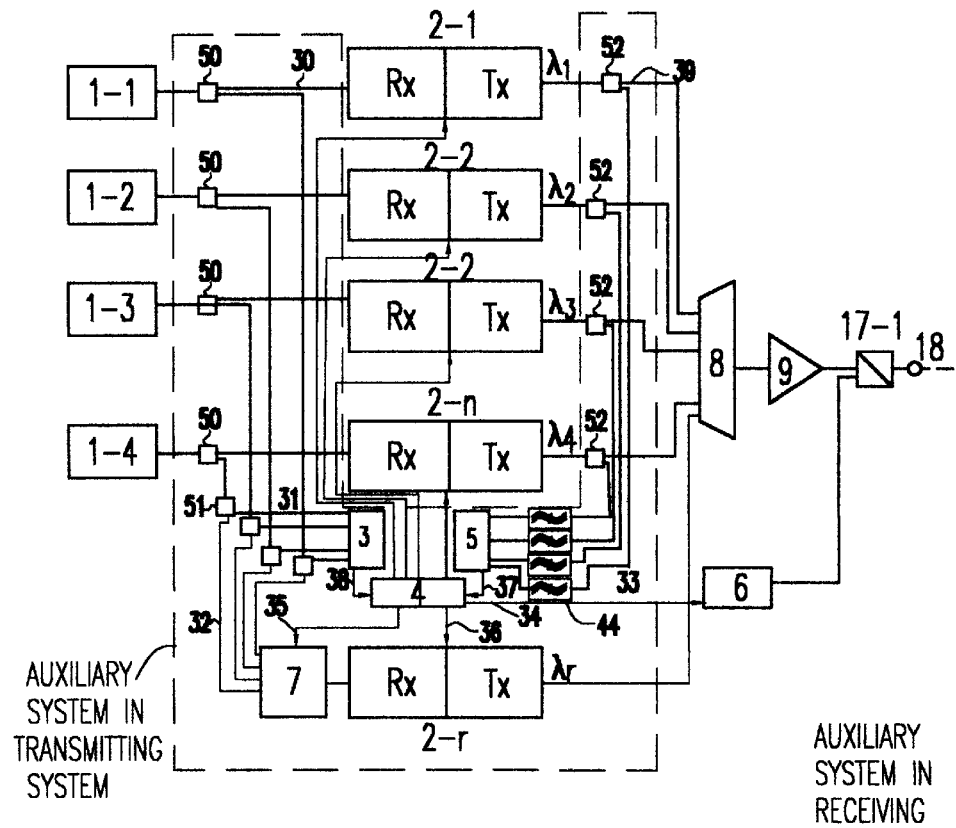
FIG. 4 is a block diagram of a transmitting apparatus and a receiving apparatus for wavelength-division-multiplex signal transmission according to a second embodiment of the present invention.
Figure 4:
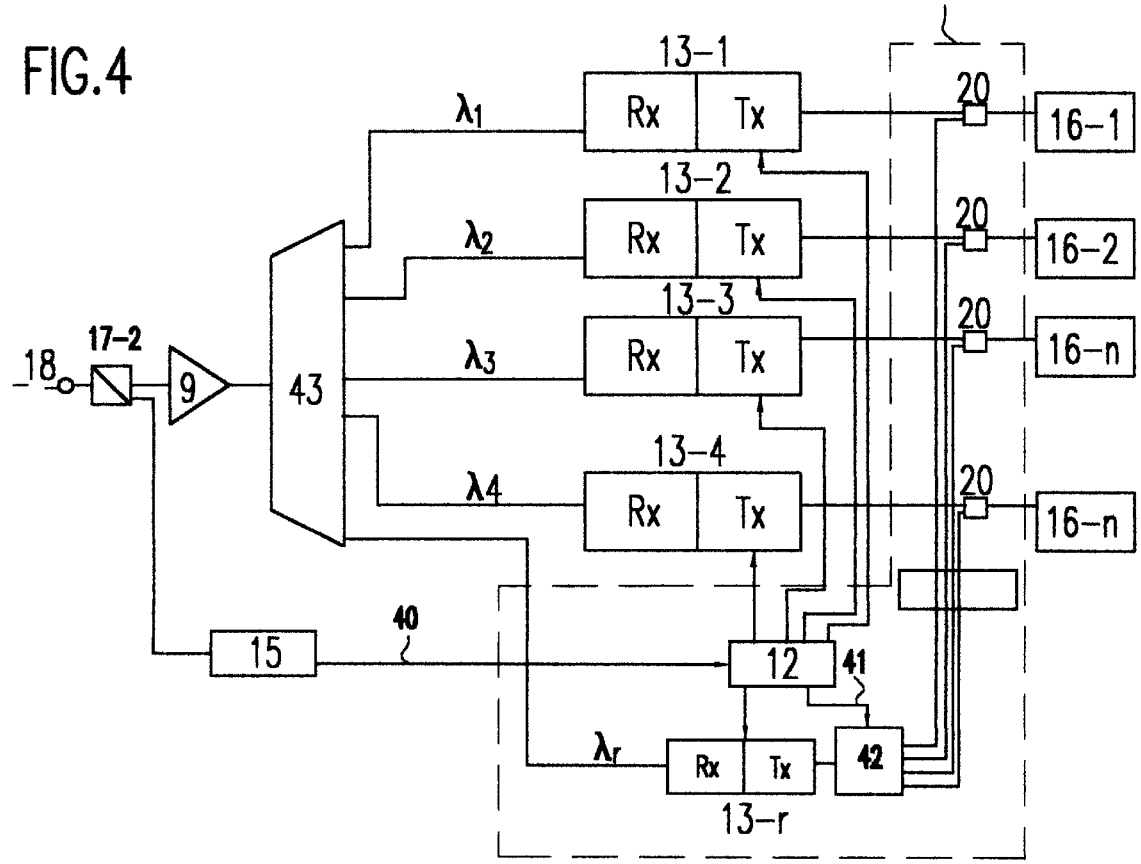

FIG. 4 shows in block form a transmitting apparatus and a receiving apparatus for wavelength-division-multiplex signal transmission according to a second embodiment of the present invention. Those parts shown in FIG. 4 which are identical to those shown in FIG. 1 are denoted by identical reference numerals and representations, and will not be described in detail below.

The transmitting apparatus and the receiving apparatus for wavelength-division-multiplex signal transmission according to the second embodiment are essentially the same as the transmitting apparatus and the receiving apparatus for wavelength-division-multiplex signal transmission according to the first embodiment, but resides in that the transponder input supervising unit 3 and the transponder output supervising unit 5 are capable of monitoring wavelengths. A wavelength selecting unit, which corresponds to the wavelength-division-demultiplexer 10, comprises an Arrayed Waveguide Grating (AWG) 43. Optical bandpass filters 44 are inserted between the transponder output supervising unit 5 and the optical dividers 52.

If the wavelength of an output optical signal from one of the transmitting transponders suffers a large deviation, then the wavelength deviates from the passband of a corresponding one of the optical bandpass filters 44, resulting in a reduction in the optical intensity supplied to the transponder output supervising unit 5. Therefore, the transponder output supervising unit 5 can detect such an output optical signal wavelength abnormality of the transmitting transponder. Based on the detected output optical signal wavelength abnormality, the failing transmitting transponder can be switched to the auxiliary transponder in the same manner as with the first embodiment.

According to the present invention, the wavelength-division-multiplex signal transmission system is capable of detecting a failure of a transmitting transponder and automatically switching from the failing transmitting transponder to an auxiliary transponder, and hence has high reliability. Furthermore, the number of auxiliary transponders, which have heretofore been required for respective wavelengths, is relatively small.

While preferred embodiments of the present invention have been described using specific terms, such description is for illustrative purposes only, and it is to be understood that changes and variations may be made without departing from the spirit or scope of the following claims.

What is claimed is:

1. A transmitting apparatus for wavelength-division-multiplex signal transmission, comprising:
   a plurality of optical signal transmitters for transmitting respective optical signals;
   wavelength converting means associated respectively with said optical signal transmitters, for converting wavelengths of optical signals transmitted from said optical signal transmitters into respective wavelengths and transmitting wavelength-converted optical signals;
   auxiliary wavelength converting means for converting a wavelength of an optical signal transmitted from said optical signal transmitters into a wavelength different from said wavelength-converted optical signals, and transmitting an auxiliary wavelength-converted optical signal;
   wavelength-division-multiplexing means for wavelength-division-multiplexing said wavelength-converted optical signals or said wavelength-converted optical signals and said auxiliary wavelength-converted optical signal, and transmitting wavelength-division-multiplexed signals;
   wavelength supervising means for monitoring said wavelength converting means and transmitting a detected failure signal when a failure of said wavelength converting means is detected;
   transmission switching means responsive to said detected failure signal, for switching from one of said wavelength converting means which suffers failure to said auxiliary wavelength converting means; and
   supervising control signal transmitting means for transmitting a supervising control signal representative of information to identify said wavelength converting means which suffers failure and information indicating switching to said auxiliary wavelength converting means.

2. A transmitting apparatus according to claim 1, wherein said wavelength supervising means comprises comparing means for comparing said optical signals supplied to said wavelength converting means and said wavelength-converted optical signals outputted from said wavelength converting means to detect said failure of said wavelength converting means.

3. A receiving apparatus for wavelength-division-multiplex signal transmission, which is combined with said transmitting apparatus according to claim 2, comprising:
   dividing means for receiving said wavelength-division-multiplexed signals from said transmitting apparatus through an optical transmission path, dividing said wavelength-division-multiplexed signals into received optical signals, and transmitting said received optical signals;
   optical signal receivers associated respectively with the received optical signals, for converting said received optical signals into respective electric signals; and
   reception switching means responsive to said supervising control signal, for supplying said auxiliary wavelength-converted optical signal to one of said optical signal receivers which corresponds to said wavelength converting means which suffers failure if said auxiliary wavelength converting means is active.

4. A receiving apparatus according to claim 3, further comprising:
   optical filters connected to output terminals of said dividing means for passing only wavelengths of said wavelength-converted optical signals.

5. A receiving apparatus according to claim 4, further comprising:
   reception optical signal amplifying means for optically amplifying said wavelength-division-multiplexed signals and supplying amplified wavelength-division-multiplexed signals to said dividing means.

6. A receiving apparatus according to claim 3, further comprising:
   reception wavelength converting means for converting wavelengths of said received optical signals and transmitting wavelength-converted received optical signals to said optical signal receivers.

7. A receiving apparatus according to claim 6, further comprising:
   optical filters connected to output terminals of said dividing means for passing only wavelengths of said wavelength-converted optical signals.

8. A receiving apparatus according to claim 7, further comprising:
   reception optical signal amplifying means for optically amplifying said wavelength-division-multiplexed signals and supplying amplified wavelength-division-multiplexed signals to said dividing means.

9. A receiving apparatus according to claim 6, further comprising:
   reception optical signal amplifying means for optically amplifying said wavelength-division-multiplexed signals and supplying amplified wavelength-division-multiplexed signals to said dividing means.

10. A receiving apparatus according to claim 3, further comprising:
    reception optical signal amplifying means for optically amplifying said wavelength-division-multiplexed signals and supplying amplified wavelength-division-multiplexed signals to said dividing means.

11. A transmitting apparatus according to claim 1 or 2, further comprising transmission optical signal amplifying means for optically amplifying said wavelength-division-multiplexed signals.

12. A receiving apparatus for wavelength-division-multiplex signal transmission, which is combined with said transmitting apparatus according to claim 3, comprising:
    dividing means for receiving said wavelength-division-multiplexed signals from said transmitting apparatus through an optical transmission path, dividing said wavelength-division-multiplexed signals into received optical signals, and transmitting said received optical signals;

optical signal receivers associated respectively with the received optical signals, for converting said received optical signals into respective electric signals; and reception switching means responsive to said supervising control signal, for supplying said auxiliary wavelength-converted optical signal to one of said optical signal receivers which corresponds to said wavelength converting means which suffers failure if said auxiliary wavelength converting means is active.

13. A receiving apparatus according to claim 12, further comprising:

reception wavelength converting means for converting wavelengths of said received optical signals and transmitting wavelength-converted received optical signals to said optical signal receivers.

14. A receiving apparatus according to claim 13, further comprising:

optical filters connected to output terminals of said dividing means for passing only wavelengths of said wavelength-converted optical signals.

15. A receiving apparatus according to claim 14, further comprising:

reception optical signal amplifying means for optically amplifying said wavelength-division-multiplexed signals and supplying amplified wavelength-division-multiplexed signals to said dividing means.

16. A receiving apparatus according to claim 13, further comprising:

reception optical signal amplifying means for optically amplifying said wavelength-division-multiplexed signals and supplying amplified wavelength-division-multiplexed signals to said dividing means.

17. A receiving apparatus according to claim 12, further comprising:

reception optical signal amplifying means for optically amplifying said wavelength-division-multiplexed signals and supplying amplified wavelength-division-multiplexed signals to said dividing means.

18. A receiving apparatus according to claim 12, further comprising:

optical filters connected to output terminals of said dividing means for passing only wavelengths of said wavelength-converted optical signals.

19. A receiving apparatus according to claim 18, further comprising:

reception optical signal amplifying means for optically amplifying said wavelength-division-multiplexed signals and supplying amplified wavelength-division-multiplexed signals to said dividing means.

20. A receiving apparatus for wavelength-division-multiplex signal transmission, which is combined with said transmitting apparatus according to claim 1, comprising:

dividing means for receiving said wavelength-division-multiplexed signals from said transmitting apparatus through an optical transmission path, dividing said wavelength-division-multiplexed signals into received optical signals, and transmitting said received optical signals;

optical signal receivers associated respectively with said received optical signals, for converting said received optical signals into respective electric signals; and reception switching means responsive to said supervising control signal, for supplying said auxiliary wavelength-converted optical signal to one of said optical signal receivers which corresponds to said wavelength converting means which suffers failure if said auxiliary wavelength converting means is active.

21. A receiving apparatus according to claim 20, further comprising:

reception wavelength converting means for converting wavelengths of said received optical signals and transmitting wavelength-converted received optical signals to said optical signal receivers.

22. A receiving apparatus according to claim 21, further comprising:

optical filters connected to output terminals of said dividing means for passing only wavelengths of said wavelength-converted optical signals.

23. A receiving apparatus according to claim 22, further comprising:

reception optical signal amplifying means for optically amplifying said wavelength-division-multiplexed signals and supplying amplified wavelength-division-multiplexed signals to said dividing means.

24. A receiving apparatus according to claim 21, further comprising:

reception optical signal amplifying means for optically amplifying said wavelength-division-multiplexed signals and supplying amplified wavelength-division-multiplexed signals to said dividing means.

25. A receiving apparatus according to claim 20, further comprising:

reception optical signal amplifying means for optically amplifying said wavelength-division-multiplexed signals and supplying amplified wavelength-division-multiplexed signals to said dividing means.

26. A receiving apparatus according to claim 20, further comprising:

optical filters connected to output terminals of said dividing means for passing only wavelengths of said wavelength-converted optical signals.

27. A receiving apparatus according to claim 26, further comprising:

reception optical signal amplifying means for optically amplifying said wavelength-division-multiplexed signals and supplying amplified wavelength-division-multiplexed signals to said dividing means.

\* \* \* \* \*